(12) United States Patent
Lakshman et al.

(10) Patent No.: US 9,083,510 B1
(45) Date of Patent: Jul. 14, 2015

(54) GENERATION AND MANAGEMENT OF CRYPTO KEY FOR CLOUD DATA

(71) Applicant: EMC CORPORATION, Hopkinton, MA (US)

(72) Inventors: Nagaraja M. Lakshman, Bangalore (IN); Priyank Tiwari, Bangalore (IN)

(73) Assignee: EMC CORPORATION, Hopkinton, MA (US)

( * ) Notice: Subject to any disclaimer, the term of this patent is extended or adjusted under 35 U.S.C. 154(b) by 122 days.

(21) Appl. No.: 13/801,603

(22) Filed: Mar. 13, 2013

(51) Int. Cl.
  *G06F 21/00* (2013.01)
  *H04L 29/06* (2006.01)
  *H04L 9/08* (2006.01)

(52) U.S. Cl.
  CPC .................................. *H04L 9/0816* (2013.01)

(58) Field of Classification Search
  CPC ............ H04L 9/08; H04L 9/18; H04L 9/0631
  See application file for complete search history.

(56) References Cited

U.S. PATENT DOCUMENTS 5,835,597 A * 11/1998 Coppersmith et al. .......... 380/28

FOREIGN PATENT DOCUMENTS

CA         2210763 C  *  2/2000

* cited by examiner

*Primary Examiner* — Izunna Okeke
(74) *Attorney, Agent, or Firm* — Workman Nydegger (57) ABSTRACT

In one example, a method includes creating a password having 'n' characters that each constitute a byte, placing the characters of the password in a first buffer, generating a random number corresponding to the password, using the random number to map a character in the first buffer to a respective random character present in a second buffer, copying the random character to a third buffer, and removing the mapped character from the first buffer. The mapping, copying, and removing processes are repeated for each character in the first buffer so that the first buffer empties and an 'xth' random string of 'n' length is generated in the third buffer, the 'xth' random string comprising the random characters to which respective characters from the first buffer were mapped. Finally, the 'xth' random string is placed in a fourth buffer and constitutes at least a portion of an encryption key.

9 Claims, 5 Drawing Sheets

GENERATION AND MANAGEMENT OF CRYPTO KEY FOR CLOUD DATA

FIELD OF THE INVENTION

Embodiments of the present invention relate to data protection. More particularly, embodiments of the invention relate to systems and methods for generating and managing cryptography keys that can be used to secure data stored in a cloud computing system.

BACKGROUND

As a result of the proliferation of data associated with the operation of modern computing systems and components, backup storage solutions for key data have become increasingly important. In some instances, these storage solutions have taken the form of large-capacity portable hard drives or similar devices that can be connected by cable or wirelessly to one or more associated computing devices. This configuration permits a user to backup data from the computing device to the portable hard drive.

However, while portable hard drives and similar devices have their place where the backup of data is concerned, such devices also have certain limitations. For example, while portable hard drives are convenient in that they can be readily connected to, and disconnected from, an associated computing device, such portability also enables such devices to be readily stolen or misplaced. Moreover, because the data on portable storage devices may be unencrypted, a person who is able to get access to the device can often readily access the stored data.

As well, portable hard drives may be well suited for home use and small businesses, but typically lack the capacity to support an enterprise, whose storage needs may be significantly greater than those of a home or small business. Moreover, portable hard drives, as well as storage systems that are adequate for enterprise use, may not provide the physical security needed, insofar as such hard drives and storage systems can be damaged by fire, natural disasters, and other occurrences.

In light of the foregoing considerations and concerns, many enterprises have looked to alternative solutions for data backup. One solution that has become of increasing interest, particularly at the enterprise level, is sometimes referred to as cloud storage, at least in part because the stored data is hosted by a third party at a remote location.

Cloud storage has proven attractive for a variety of reasons. For example, cloud platforms are typically able to handle large amounts of data, and can be accessed by many users, without regard to the physical location of the user. As another example, cloud storage may relieve an enterprise of having to purchase and maintain physical assets for data storage at the enterprise location. Likewise, cloud storage can reduce the workload of enterprise IT personnel.

Despite its potential benefits however, cloud storage is not without its shortcomings. Notably, many cloud storage systems and methods present data security concerns either because they have no, or inadequate, data security measures in place. This is a problem for data storage service providers, since potential clients are not likely entrust their data to a cloud storage system without some assurance that the data will be secure from unauthorized access and manipulation.

In sum, cloud-based data storage can provide a number of benefits for an enterprise. Given the benefits that may be realized from cloud storage of data, an enterprise may wish to take advantage of that solution. Accordingly, it would be useful for an enterprise and/or data storage service provider to be able to store, access and archive data in the cloud, while reliably securing that data from unauthorized access and manipulation.

BRIEF DESCRIPTION OF THE DRAWINGS

The appended drawings contain figures of example embodiments to further illustrate and clarify various aspects of the present invention. It will be appreciated that these drawings depict only example embodiments of the invention and are not intended to limit its scope in any way. Aspects of the invention will be described and explained with additional specificity and detail through the use of the accompanying drawings in which.

DETAILED DESCRIPTION OF SOME EXAMPLE EMBODIMENTS

Embodiments of the present invention generally relate to data security. More particularly, embodiments of the invention relate to systems and methods for generating and managing cryptography keys that can be used to secure data stored in a cloud computing system. It should be noted that the following discussion is provided solely by way of illustration and is not intended to limit the scope of the invention in any way.

At least some embodiments of the invention may be employed in an environment that includes a file system manager that is operable to migrate data from a storage device, which can be part of a network, node, or computing device, to external media, which may reside in a cloud environment. The operation of the file system manager may proceed in conjunction with a set of rules that can dictate how particular files, or groups of files, are to be handled.

In one example of a data migration process, the data that is to be migrated is identified, and a password is used to generate an encryption key for encryption of that data. The data to be migrated is then encrypted with the encryption key, while the source data on the storage device remains unencrypted. The encrypted data may then be migrated by the file system manager to external media, such as a cloud storage platform for example. Among other things, migration of the data may free space on a storage device for data that, for example, is needed more often than the migrated data.

Once stored in the cloud, the encrypted data can only be accessed/manipulated by a user who has access to the password that was used to generate the encryption key in the first instance. Thus, even if an unauthorized user should somehow gain access to the cloud storage platform, that user cannot gain access to the encrypted data without the password.

A. Example Operating Environment

Figure 1:
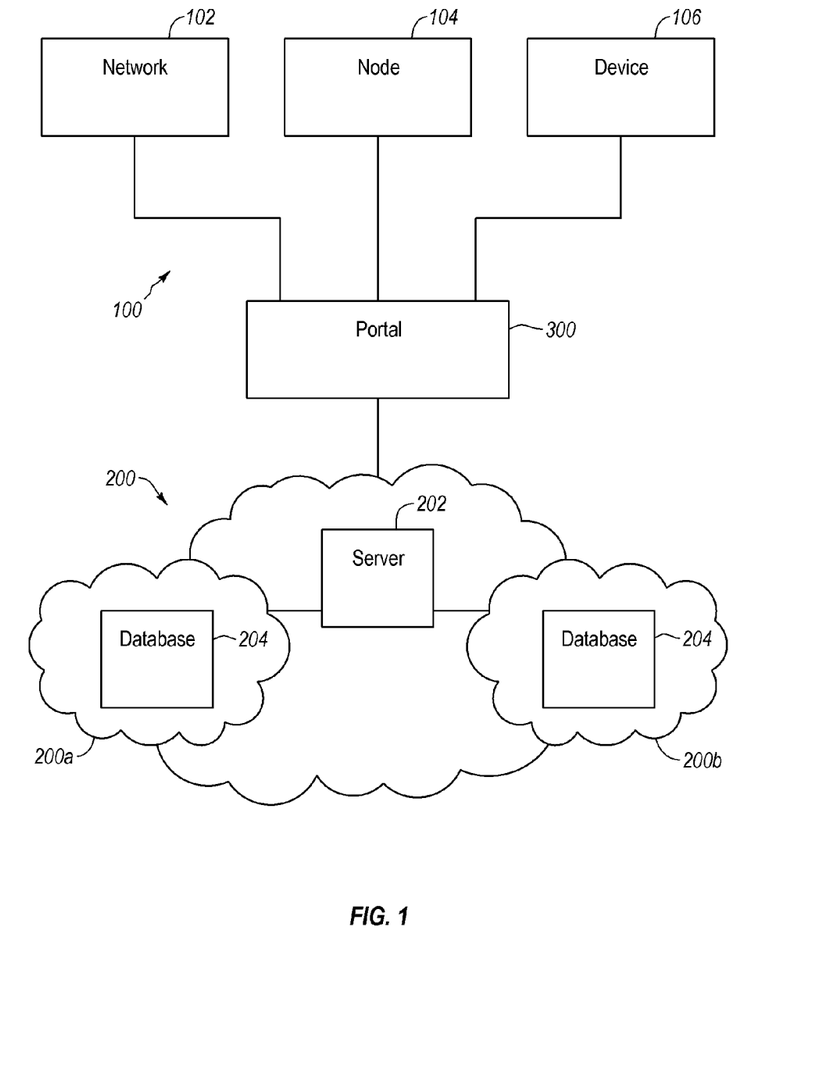
FIG. 1 is a block diagram of an example environment in which cloud storage and related processes may be implemented.

FIG. 1 illustrates an example of a computer system 100 configured for communication with a remote storage system, such as cloud storage system 200 for example. In this regard, it should be noted that embodiments of the invention need not be employed in connection with a cloud storage system but may instead be employed with other types of remote storage systems.

In general, the computer system 100 illustrated in FIG. 1 may include one or more networks 102, nodes 104, and/or devices 106, any or all of which may be configured to communicate with each other and/or the cloud storage system 200. One or more networks 102 may comprise any type of wired or wireless network, examples of which include a local area network (LAN), wide area network (WAN), and the Internet. One or more nodes 104 may include or be associated with hardware, examples of which may include one or more of processors, network adapters, memory of various types including flash memory, storage media such as magnetic and optical media, caches, communication devices, databases, and any combination of the foregoing. Finally, one or more devices 106 may comprise any type of computing device. Such computing devices 106 may include, for example, one or more hard drives, which may or may not be partitioned, other storage media, one or more processors, memory, communication devices which may be wireless or hardwired, routers, displays, and user input devices.

The computer system 100, including the aforementioned elements, may include storage configured to store any type of data, examples of which include applications, email, video, image, text, database, records, user data, files, folders, calendars, documents, spreadsheets, or any combination of the foregoing. As discussed in more detail below, any of the foregoing types of data may be encrypted and migrated to the cloud storage system 200 or other secondary storage.

With continued reference to FIG. 1, one or more of the elements of the computer system 100 may be configured to communicate bidirectionally with the cloud storage system 200 by way of a portal 300. In some instances, the portal 300 may be collocated with the computer system 100, although that is not necessary. In this, or other examples, the portal 300 may be web-based so that regardless of the location of the computer system 100 and the cloud storage system 200, a user can move data between the computer system 100 and the cloud storage system 200 and/or perform other operations involving the computer system 100 and the cloud storage system 200.

Figure 2:
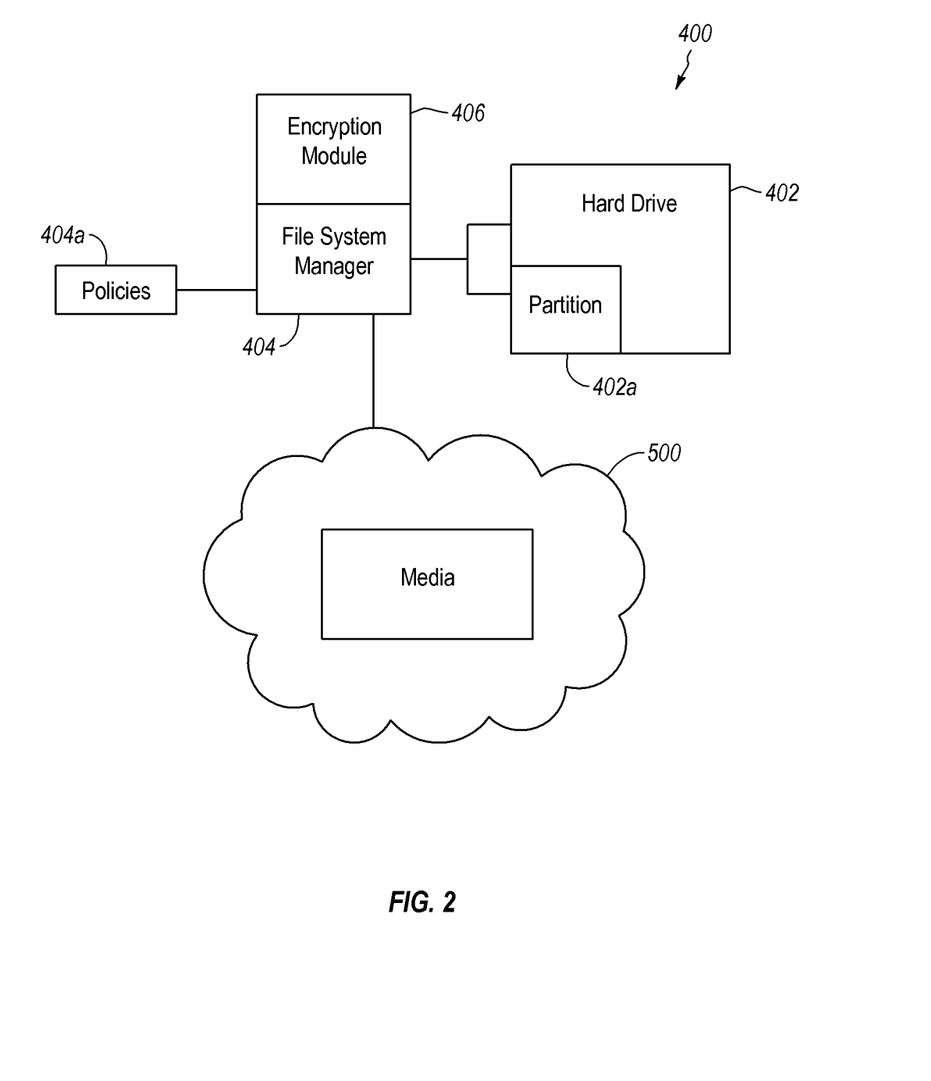
FIG. 2 is a block diagram disclosing a file management system and associated components that may be used in conjunction with a cloud storage environment.

Turning now to the cloud storage system 200, it should be noted that as used herein, cloud storage systems embrace, but are not limited to, network-based storage that is hosted by a third party. The cloud storage system 200 may include multiple servers 202 that are virtualized by the third party host and presented as storage pools to the owners/users of the stored data. The servers 202 may include, or have access to, one or more databases 204. In the example of FIG. 2, each of the databases 204 is associated with a respective site 200*a* and 200*b*, although this arrangement is not required.

B. Example File Management System

Directing attention now to FIG. 2, details are provided concerning aspects of a file management system 400 that may be employed in conjunction with various embodiments of the invention. The example file management system 400, whose components may be implemented in a single computing device or distributed amongst several computing devices, may include storage media such as a hard drive 402 that may, but need not, include a partition 402*a*. The hard drive 402 may be configured for operational control by a file system manager 404, and may be implemented as an NTFS volume, though that is not necessary. In general, the file system manager 404 can be any hardware, software, or combination thereof, operable to perform various operations with respect to files, where such operations may include deletion of files, purging of files, and moving of files. The operations performed by the file system manager 404 may be dictated by a set of policies 404*a* included in, or accessible by, the file system manager 404.

In connection with the operation of the file system manager 404, an encryption module 406 is provided that may be included in, or accessible by, the file system manager 404. In general, and as discussed in more detail below, the encryption module 406 is configured to encrypt data that is migrated from the hard drive 402 and/or partition 402*a* to a backup destination, which may comprise media 500 such as a disk, tape, EMC Atmos™ cloud, an optical device, or any combination of the foregoing.

Among other things, encryption of data migrated to the media 500 may prevent access and manipulation of the encrypted data by an unauthorized user, even if the unauthorized user somehow manages to gain access to media 500. This may be particularly advantageous where the media 500 comprises or includes a cloud storage environment.

As is apparent from the foregoing discussion, the file management system 400 and its components may be implemented in a variety of forms. Following is a discussion of one specific implementation of such a file manager, though it should be noted that the following discussion of that particular implementation is not intended to limit the scope of the invention in any way. More generally, any other file management system and/or components operable to perform the functionality disclosed herein may alternatively be employed.

As suggested above, the file system manager 404 in one particular implementation comprises the EMC DiskXtender™ for Windows®, sometimes referred to as DX. Briefly, DX is an automated, policy-based, file system-centric solution for migrating inactive data off higher-cost storage, such as hard drive 402 and/or partition 402*a* for example, to lower-cost disk, tape, EMC Atmos™ cloud, or optical devices, to name a few examples. The hard drive 402, partition 402*a*, or other storage may be a New Technology File System (NTFS) volume, for which the file system manager 404 provides file migration services by moving files to secondary storage, such as media 500, and fetching files from secondary storage according to various policies.

DX may include various components, one example of which is sometimes referred to as DiskXtender Service (DxDmService). In general, the DiskXtender service (DxDmService) is a user mode daemon that works in conjunction with the DiskXtender filter driver (DxSpy) to manage selected files on NTFS volumes. This service is a standard Windows service that can be managed through the Service Control Panel. As well, DX may include DiskXtender Filter Driver (DxSpy). In general, DiskXtender uses what may be referred to as file system filter driver technology, to monitor low-level activity on extended drives, which are discussed in more detail below.

Operationally, a background scan process of DX verifies that all the user data on the NTFS volume, which may be referred to as the extended drive, that need to be managed is, in fact, being managed by DX. The user data is automatically migrated from the extended drive to secondary storage based on system policies. Users and applications can then retrieve the data from secondary storage when necessary for viewing and editing. DX may be particularly useful when employed in conjunction with data encryption techniques, as disclosed elsewhere herein.

In connection with the foregoing discussion of DX, it may be useful to consider various definitions related to DX. Thus, a 'background scan' process refers to a performing a scan of the extended drive that evaluates files against configured rules and performs any necessary system activity resulting from the evaluation, such as writing files to the move or purge list, or deleting files, for example. Another example process is 'purging,' which refers to the process of removing files from the extended drives, after the file has been moved to secondary storage, while leaving a file tag behind. As a result of the presence of the file tag, the associated file appears to reside on the extended drive.

With regard to some example components associated with DX, an 'extended drive' includes an NTFS volume such as hard drive or partitioned part of the hard drive, for which the file system manager provides file migration services by moving files to secondary storage, discussed above, and fetching files from secondary storage according to the set parameters. As well, 'storage media' refers to media external to the extended drive, such as secondary storage, to which DX moves files.

Finally, and as noted earlier, various rules may be employed to guide the operation of DX. For example, 'delete rules' refer to rules which define which files should or should not be automatically deleted from the extended drive. As another example, 'move rules' define which files should or should not be moved to the media. As a further example, 'purge rules' define which files should or should not be purged from the extended drive.

C. Example Encryption Key Generation Processes

Figure 3:
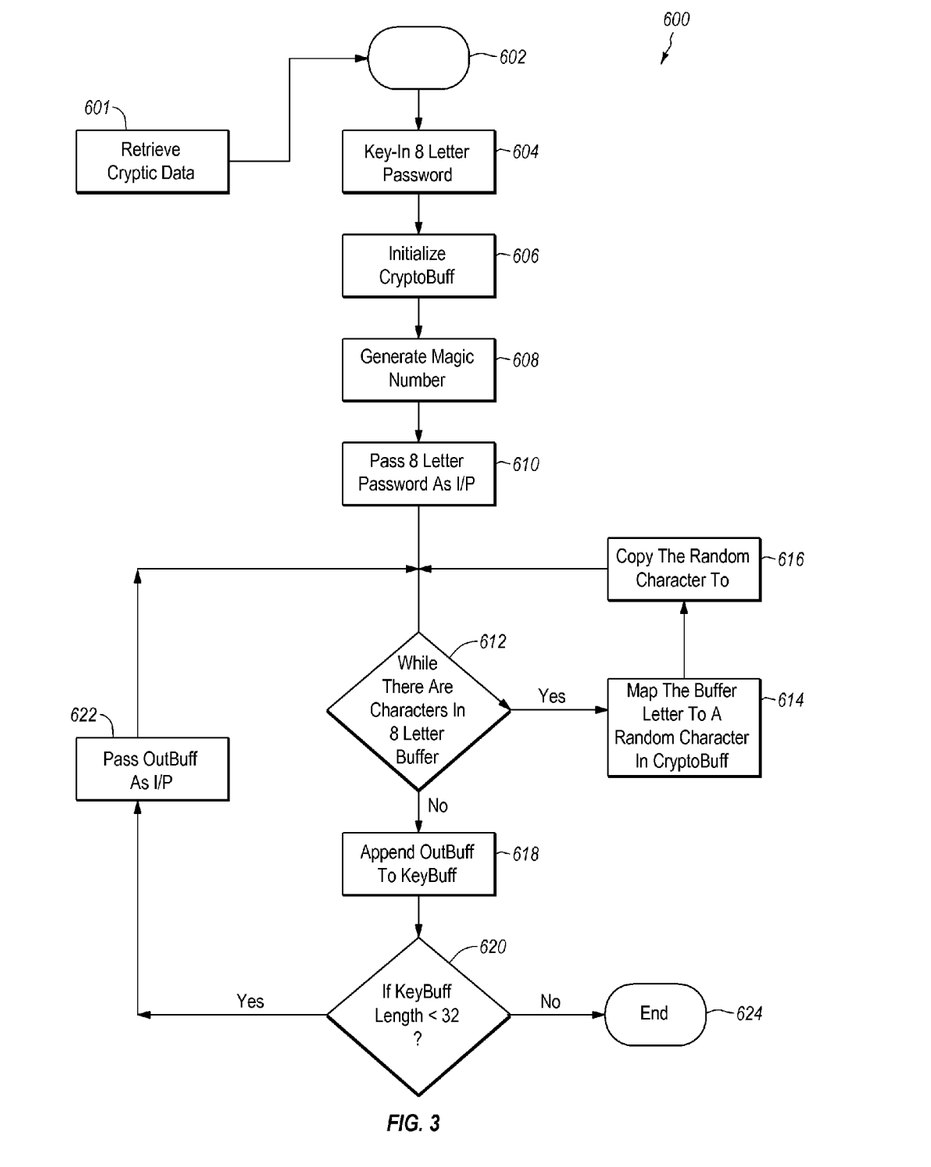
FIG. 3 is a flow diagram of an example process for generating an encryption key that may be used in conjunction with a data backup process associated with the file management system.

Turning now to FIG. 3, details are provided concerning an example of a process 600 for creating an encryption key such as may be used in the encryption/decryption of data migrating between a primary storage and secondary storage. As explained elsewhere herein, the data may be encrypted prior to its migration to secondary storage. In at least some embodiments, an encryption mechanism including the data encryption functionality discussed below may be incorporated into a file management system, such as DX or another file management system, although that is not required.

In general, and as noted earlier, the data that is to be migrated is identified, and an encrypted password is used to generate an encryption key for encryption/decryption of that data. The data to be migrated is then encrypted with the encryption key, while the source data on the storage device remains unencrypted. Once stored in secondary storage, such as a cloud storage system for example, the encrypted data can only be accessed/manipulated by a user who has access to the password that was used to generate the encryption key in the first instance.

With particular reference now to FIG. 3, the process 600 begins when a user, such as an administrator for example, retrieves cryptic data 601, such as from a registry for example, that may include an encrypted password and security information. The password is then decrypted and the process 600 advances to 602 where a user defines a buffer filled with unique characters in random order. One example of such a buffer is denoted as 'CryptoBuff' in FIG. 3. In one particular embodiment, the buffer size is 255, although other sizes could be used.

Next, the user enters a password 604 using an interface of a file management system. The password may have any suitable number of bytes, and may be encrypted using any suitable techniques, examples of which will be apparent to those of ordinary skill in the art. In one particular embodiment, an 8 byte password is entered. In this example, each byte corresponds to a letter or number of the password. As discussed below, an 8 byte password may be used to generate a 32 bit encryption key.

It should be noted that that notwithstanding use of the word 'password,' the passwords used herein need not constitute grammatical words, nor include any letters. In fact, passwords may be alpha, numeric, or alphanumeric. After the password has been defined 604, the buffer can then be initialized 606. Initialization of the buffer 606 enables the generation of a unique encryption key, discussed in more detail below.

The process 600 continues with the generation of a 'magic number' 608. More specifically, a random number is generated for the 8 byte password. Any suitable logic may be employed in the generation of the magic number. By way of illustration, such logic might be as simple as adding up the letters of the password. Thus, for the example password 'john1234,' the magic number can be calculated as: MagicNo='j'+'o'+'h'+'n'+'1'+'2'+'3'+'4.' If desired, the random value thus generated can be further modified, for example, by being added with some predefined number thus: MagicNo=MagicNo+0x11F. The foregoing are provided only by way of example, and it will be appreciated that a random number suitable for use in the process 600 can be generated in a variety of other ways as well.

The magic number and the buffer may be used to map each letter of the password to a random number. In general, the password is used as the initial input 610 to a mapping process in which each byte of the password is mapped to a random byte of the buffer. The initial mapping process produces an 8 letter random string that can be used as an input to a further mapping iteration. The process can be repeated, each time using the most recently generated 8 letter random string as the input, until a random string of desired length has been generated. In some instances, the process is repeated until a 32 byte random string is produced, but longer or shorter strings may alternatively be employed.

With continued reference to FIG. 3, the mapping portion of the process 600 begins at 612 where a query is performed as to whether any characters remain in an 8 letter buffer that includes the letters of the password. The buffer size in this example corresponds to the length of the password. As noted above however, passwords of other lengths can be used and, correspondingly, letter buffers of different sizes may also be used.

If one or more characters remain in the 8 letter buffer, the process 600 continues and a letter from the letter buffer is mapped 614 to a random character in the CryptoBuff. The random character is then copied 616 to a buffer denoted as 'OutBuff' in FIG. 3, and the process 600 is reentered at 612 and repeats the aforementioned progression from 612 to 614 to 616, until each character in the letter buffer has been mapped to a random character of the CryptoBuff. When the letter buffer is empty, the process 600 advances and the 8 letter random string contained in the OutBuff is appended 618 to the contents, if any, of a buffer denoted as 'KeyBuff.' The KeyBuff will be empty until the first 8 letter random string is placed there.

After the 8 letter random string has been appended to any strings already present in KeyBuff, the length of the resulting string is checked 620 and if the string is shorter than the desired length, the 8 letter random string contained in the OutBuff is used as the input 622 to the letter buffer for generation of another 8 letter random string. This process may continue until the length of the string in KeyBuff is the desired length, such as 32 bytes for example. On the other hand, if the string length in KeyBuff is the desired length, then the process 600 quits 624 and the 32 byte random string in KeyBuff can be used for the encryption of data.

In connection with the example mapping process disclosed above, it will be appreciated that the password bytes can be mapped in a variety of ways. Following is one example of a function prototype for mapping the password bytes:

unsigned char MapByte(unsigned char InByte, unsigned int InBytePos);
Where,
InByte→Individual byte of the 8 letter password (or 8 letter string)
InBytePos→Byte position in CryptoBuff and this can be calculated as follows: InBytePos=MagicNo+LoopCount;
Where LoopCount is the byte position of "InByte"

In connection with the foregoing, a variety of algorithms may be used. Following is one example of a suitable algorithm:

Calculate OutBytePos (InByte+InBytePos)
While OutBytePos is greater than 255//byte position should be<=255
OutBytePos=OutBytePos−255
Return the byte at position "OutBytePos" from CryptoBuff As noted above, the mapping of all the characters in the letter buffer results in an 8 letter random string, and this mapping can be repeated until a random string, or key, of desired length is obtained. Thus, the length of the random string need not be 8 letters however and could be longer, or shorter, depending upon the length of the associated password.

Finally, and with continued reference to FIG. 3, an example code snippet is set forth below that may be employed in the generation of an encryption key. This snippet is provided solely by way of example, and various other code may be written that can provide comparable results.

```
Stage 1:
Initialize CryptoBuff
iKeyLen=Get length of user password (UserPasswd)
InBuff=Allocate a memory of length iKeyLen
KeyBuff=Allocate a memory of 32 bytes
Stage 2:
//Generate magic value
iLoopCount=0;
iMagicVal=0;
while(iLoopCount<iKeyLen)
{
iMagicVal=iMagicVal+InBuff[iLoopCount];
iLoopCount++;
}
iMagicVal=iMagicVal+0x11F;
Stage 3:
//Generate 8 byte random string
OutBuff=Allocate a memory of length iKeyLen
Copy UserPasswd to InBuff
iLoopCount=0;
while (iLoopCount<iKeyLen)
OutBuff[iLoopCount]=MapByte(InBuff[iLoopCount],
    iMagicVal+iLoopCount);
iLoopCount++;
Stage 3a:
Copy OutBuff (8 bytes) to KeyBuff;
Stage 4:
//Now generate next 8 bytes of the key . . .
while (iLoopCount<iKeyLen)
OutBuff[iLoopCount]=MapByte(OutBuff [iLoopCount],
    iMagicVal+iLoopCount);
iLoopCount++;
Stages 4a, 4b:
Append OutBuff (8 bytes) to KeyBuff; //16 bytes so far
Stage 5:
Repeat stage 3, for generating 32 bytes of key
```

Encryption keys generated by processes such as those disclosed in FIG. 3 may be advantageous for any of a variety of reasons. For example, the processes disclosed herein can result in a key that may be difficult to reverse engineer and is, thus, quite secure. As well, and discussed in more detail below, the key generation processes disclosed herein may be relatively cost-effective insofar as key management is relatively simple and, for example, does not require an additional machine to store the key. Further, keys generated in accordance with the disclosed processes may contribute to the overall speed of operation of related systems and processes, such as data migration and retrieval processes, insofar as only a single key is employed in the encryption of data. Moreover, the disclosed keys provide protection against registry corruption, insofar as password registry corruption can be detected quickly, or immediately. Finally, use of the disclosed keys can provide protection against an incorrect password, since an incorrect password is detected by comparing it with the encrypted value that may be stored in secondary storage, such as a cloud system.

It should be noted that the foregoing are provided by way of example, and are not intended to limit the scope of the invention in any way. Other embodiments may possess fewer than all, or none, of the aforementioned attributes, and there is no requirement that any embodiment possess any one or more of the aforementioned attributes.

D. Example Data Migration Processes

As noted earlier, at least some embodiments of the invention are concerned with migration of encrypted data from one storage location to another. In one particular example embodiment, encrypted inactive data can be migrated off relatively higher-cost primary storage, such as hard drive 402 and/or partition 402a for example, to lower-cost secondary storage such as disk, tape, cloud storage systems such as EMC Atmos™ cloud, or optical devices, for example.

Figure 4:
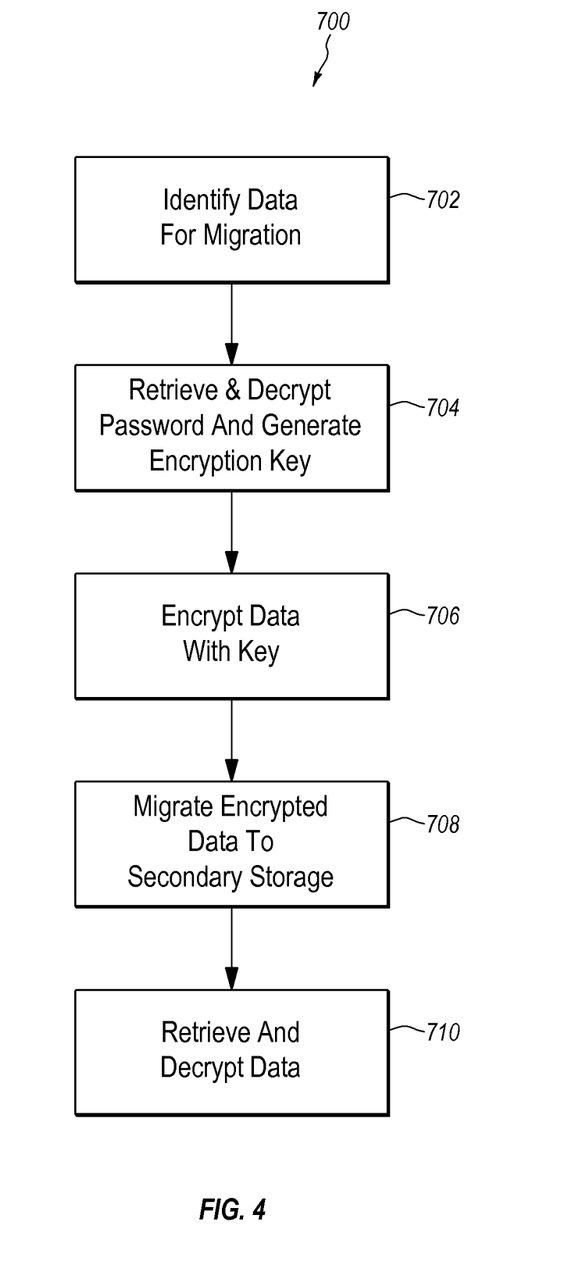
FIG. 4 is a flow diagram of an example of a data migration process for encrypted files.

With attention now to FIG. 4, a process 700 is disclosed that is directed to encryption of data, and migration of the encrypted data from one storage location to another. The process 700 may be performed in whole or in part by a system such as DX. The process 700 may begin with an identification 702 of data that is to be migrated from a first storage location to a second storage location. The data that is to be migrated may be automatically selected based on rules applied by DX or another file system manager during a background scan of an extended disk or other storage location.

In one particular example, the data identified at the first storage location for migration resides on a hard drive, or partition of a hard drive, either of which may constitute an extended drive, and is identified for migration to a cloud storage system. It was noted earlier herein that the data to be migrated can be any type(s) of data, and the scope of the invention is not limited to the handling or processing of a particular type or types of data.

After, or before, the data is identified for migration, and as discussed in more detail in connection with FIG. 5, an encrypted password is retrieved, decrypted, and used to generate 704 an encryption key. One example process for generation of an encryption key was discussed above in connection with FIG. 3. In general, the encryption key can be used to encrypt the identified data 706 at the source, or first storage location, before the data is migrated to the second storage location. Encryption of the data prior to migration can help to ensure that the data, once migrated, is secure from unauthorized access and manipulation. Encryption of the data can be performed by, or at the direction of, various applications, one example of which is DX, discussed above. In some embodiments, the source data, namely, the data located at the first storage location, is not encrypted or migrated. Rather, a copy of the source data is encrypted and migrated, and the source data itself remains unencrypted. In other instances, the source data does not remain at the source, but is purged.

It will be appreciated that a variety of encryption techniques may be employed to encrypt the data that is to be migrated, and the scope of the invention is accordingly not limited to any particular technique or group of techniques. In one particular example however, data may be encrypted using the Advanced Encryption Standard (AES) specification. In this example, the algorithm used will be a symmetric-key algorithm where the same key is used for both encryption and decryption of data. Encryption key length is 32 bytes (256 bits). In this example, RSA BSAFE Crypto-C Micro edition 4.0.0.0 libraries are used for encrypting the data.

In any case, the encrypted data can then be migrated 708 to secondary storage. In one particular example, the encrypted data is migrated, by a file system manager such as DX for example, to a cloud storage system, such as the EMC Atmos™ cloud for example. The password which was the basis for generation of the encryption key can then be used to retrieve 710 the migrated encrypted data, and the encryption key can be used to decrypt the retrieved data. In one example embodiment, retrieval of the encrypted data from the secondary storage can be effected by way of a DX console, although the DX console is not required in every case.

E. Example Aspects of Key Management

Figure 5:
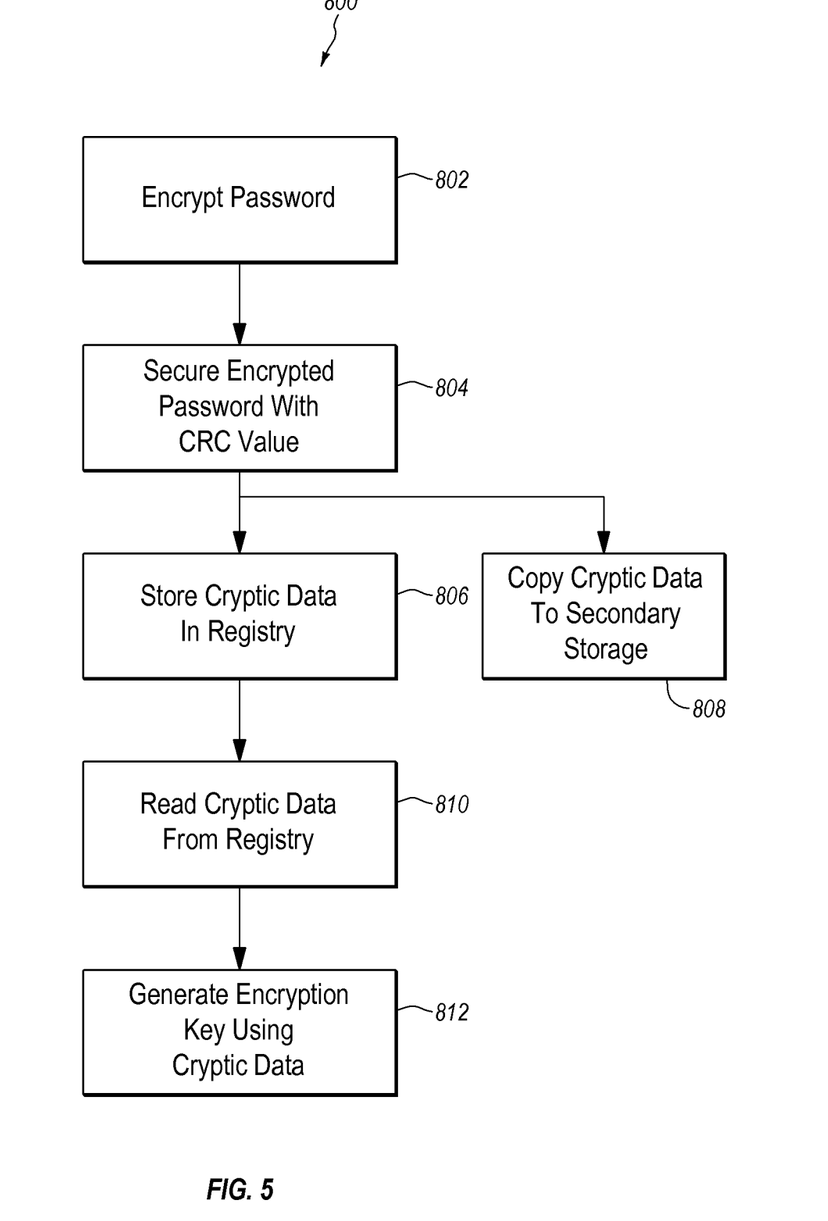
FIG. 5 is a flow diagram of an example process for encryption key management.

With attention now to FIG. 5, aspects of an example process 800 for encryption key management are disclosed. At 802, a password such as the example 8 letter password discussed above, is encrypted using any suitable encryption mechanism. Cryptic data can then be defined by securing 804 the encrypted password with security information, such as a cyclical redundancy check (CRC) value. The cryptic data, namely, the encrypted password+CRC value is then stored 806 in the registry, and also copied 808 to the secondary storage, such as a cloud computing system, in the form of a file that may be set for infinite retention.

During a process such as that disclosed in FIG. 4, one example of which may comprise the DxDmService or a portion thereof, the cryptic data is read 810 from registry and used to generate 812 the encryption key. One example of a process for generating an encryption key using an encrypted password is discussed above in connection with FIG. 3.

As discussed elsewhere herein, the encryption key may be used to encrypt data that is to be migrated from one storage location to another storage location. With particular reference to use of DX in the EMC Atmos™ cloud environment, if the registry entry noted above is not found or is found to be corrupted, the Atmos™ media service will be halted. The user may then have to re-configure the Atmos™ media service with the old password and restart the DxDmService. If the user enters a wrong password, namely, a password that is different from the old password, the re-configure operation will fail. Password validation can be achieved by comparing the password with the copy of cryptic data stored in the Atmos™ cloud and, if there is a match between the password and the cryptic data, then the password is validated. Among other things, this approach to key management requires the user to use a single password for the entire encryption operation, such that all the data is encrypted using one password. As noted above, the use of a single password and associated key may contribute to the relatively rapid performance of data migration operations.

It will be appreciated that a variety of scenarios may arise in connection with one or more of the systems and processes disclosed herein. Following is a discussion of some example scenarios and possible outcomes that may demonstrate the effectiveness of those systems and processes. While the scenarios below may specifically refer to the DX platform, it should be understood that the scope of the invention is not limited in that regard, and the actions below can be employed in connection with other platforms and processes as well.

E.1 Malicious User Attempts to Corrupt Registry

If the registry should be corrupted intentionally or unintentionally, the cryptic data corruption is detected immediately by virtue of the CRC value included in the cryptic data. Under such circumstances, the cloud media service will be halted until the user reconfigures the service with a correct password.

E.2 Server Crashes

If the registry data is lost or corrupted because of a server crash, such as a DX server crash for example, the user can restore the registry content in a number of ways. For example, the user may import the lost registry content from registry backup. Alternatively, the user may reconfigure the cloud media service with the correct password.

E.3 User Forgets Password

In the event that the user should forget the password, the user can contact the appropriate support team, such as the DX support team for example, for assistance in reconfiguring the cloud media service with new password.

E.4 User Enters Incorrect Password

If the user enters an incorrect password, detection of the incorrect password can be achieved. In one particular example, detection of the incorrect password involves generating cryptic data for a new password entered, comparing the cryptic data generated for the new password with the old cryptic data, which can be stored in a cloud computing system, and, if there is a mismatch, asking the user to re-enter the correct password until he/she succeeds. If the user fails to enter the correct password after a defined number of attempts, the cloud media service will be halted.

E.5 Cryptic File is Corrupted

In at least some embodiments, the file containing the cryptic data in secondary storage, such as a cloud storage system for example, may be protected in two ways. First, that file is set with infinite retention. This ensures that no one can either delete or corrupt the file. Second, because the cryptic data is guarded with CRC or comparable mechanism, any data corruption, whether inadvertent or deliberate, can be detected immediately.

E.6 Cryptic File is Deleted

Because the file containing the cryptic data may be set for infinite retention, deletion of the file is prevented.

E.7 Password Reconfiguration

In the event that the user desires to reconfigure the password, the user can contact the appropriate support team, such as the DX support team for example, for assistance in reconfiguring the cloud media service with a new password.

F. Computing Systems, Elements and Processes

The embodiments disclosed herein may include the use of a special purpose or general purpose computer including various computer hardware or software modules, as discussed in greater detail below. Among other things, any of such computers may include a processor and/or other components that are programmed and operable to execute, and/or cause the execution of, various instructions, such as the computer-executable instructions discussed below.

Embodiments within the scope of the invention may also include the use of a special purpose or general purpose computer including various computer hardware or software modules, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for encryption, the method comprising:
creating a password having 'n' characters that each constitute a byte;
placing the characters of the password in a first buffer;
generating a random number that corresponds to the password;
using the random number to map a character in the first buffer to a respective random character that resides in a second buffer;
copying the random character to a third buffer;
removing the mapped character from the first buffer;
repeating the mapping, copying, and removing processes for each character in the first buffer so that the first buffer empties and an 'xth' random string of 'n' length is generated in the third buffer, the 'xth' random string comprising the random characters to which respective characters from the first buffer were mapped; and
placing the 'xth' random string in a fourth buffer, the 'xth' random string comprising at least a portion of an encryption key.

2. The method as recited in claim 1, further comprising creating an 'x+1' random string using the 'xth' random string, and appending the 'x+1' random string to the 'xth' random string.

3. The method as recited in claim 2, wherein the method is repeated for x=2 and x=3, such that an encryption key is created that includes four random strings.

4. The method as recited in claim 3, wherein the encryption key is a 32 byte encryption key.

5. The method as recited in claim 1, wherein the second buffer has a size of 255 bytes and is filled with unique characters in random order.

6. The method as recited in claim 1, wherein 'n' is 8 and 'x' is 1.

7. The method as recited in claim 1, further comprising performing an operation on the random number before using the random number to map characters.

8. The method as recited in claim 1, further comprising using the encryption key to encrypt data.

9. The method as recited in claim 1, further comprising after creating the password, but before placing the characters of the password in the first buffer:
encrypting the password;
creating cryptic data that includes the encrypted password and security information;
storing the cryptic data in a registry associated with a cloud storage system; and
retrieving the cryptic data and decrypting the password.

* * * * *